(12) United States Patent
Peyla et al.

(10) Patent No.: US 9,732,293 B2
(45) Date of Patent: Aug. 15, 2017

(54) FUEL COMPOSITION

(75) Inventors: Richard J. Peyla, Orinda, CA (US);
William J. Cannella, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/443,983

(22) Filed: Apr. 11, 2012

(65) Prior Publication Data
US 2012/0260877 A1    Oct. 18, 2012

Related U.S. Application Data

(60) Provisional application No. 61/475,544, filed on Apr. 14, 2011.

(51) Int. Cl.
*F02B 43/00*     (2006.01)
*C10L 1/02*      (2006.01)
*F02B 1/12*      (2006.01)

(52) U.S. Cl.
CPC ............ *C10L 1/023* (2013.01); *F02B 1/12* (2013.01)

(58) Field of Classification Search
CPC ...... F02B 1/04; F02B 3/06; F02B 1/12; C10L 1/026
USPC .............. 123/1 A; 585/14; 44/447, 451
See application file for complete search history.

(56) References Cited

U.S. PATENT DOCUMENTS

| 6,290,734 | B1 | 9/2001 | Scott et al. | |
| 7,128,046 | B1 | 10/2006 | Dec et al. | |
| 7,981,170 | B1 | 7/2011 | Lieder et al. | |
| 2002/0026926 | A1* | 3/2002 | Loye | F02B 1/12 123/435 |
| 2002/0166283 | A1 | 11/2002 | Kalghatgi | |
| 2005/0022446 | A1* | 2/2005 | Brundage | C10L 1/06 44/451 |
| 2009/0151236 | A1* | 6/2009 | Shibata | C10L 1/026 44/447 |

FOREIGN PATENT DOCUMENTS

| GB | WO 2008071628 A1 * | 6/2008 | ............ C10L 1/231 |
| JP | 2006-077179 A | 3/2006 | |
| JP | 2007-291310 A | 11/2007 | |
| WO | 2010-109754 A1 | 9/2010 | |

OTHER PUBLICATIONS

Japanese Office Action dated Oct. 28, 2015 issued in counterpart JP Application No. 2014-505233.

* cited by examiner

*Primary Examiner* — Lindsay Low
*Assistant Examiner* — Omar Morales
(74) *Attorney, Agent, or Firm* — Ryan, Mason & Lewis, LLP

(57) ABSTRACT

A fuel composition having a boiling range of between 95 to 440 degrees Fahrenheit containing (a) a saturates content below 55 vol %; (b) a RON of from about 88 to about 91; (c) an olefins content of from about 0 to about 5 vol %; (d) an aromatics content of from about 32 to about 40 vol %; (e) an ethanol content of from about 8 to about 16 vol %; (f) an octane sensitivity of from about 8 to about 11; and the fuel composition is used in an HCCI engine.

17 Claims, 3 Drawing Sheets

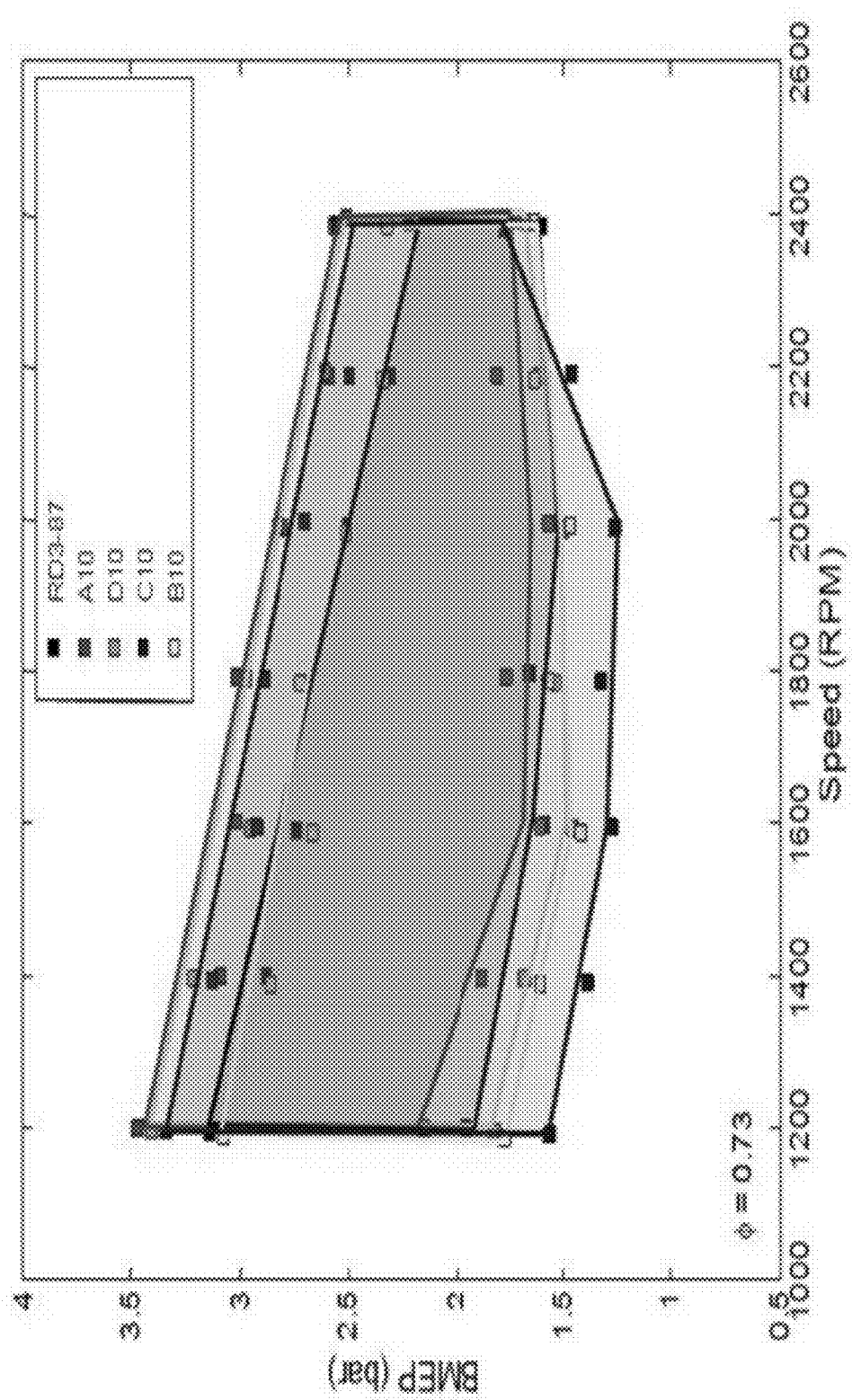
Figure 1: Speed-Load Operating Range

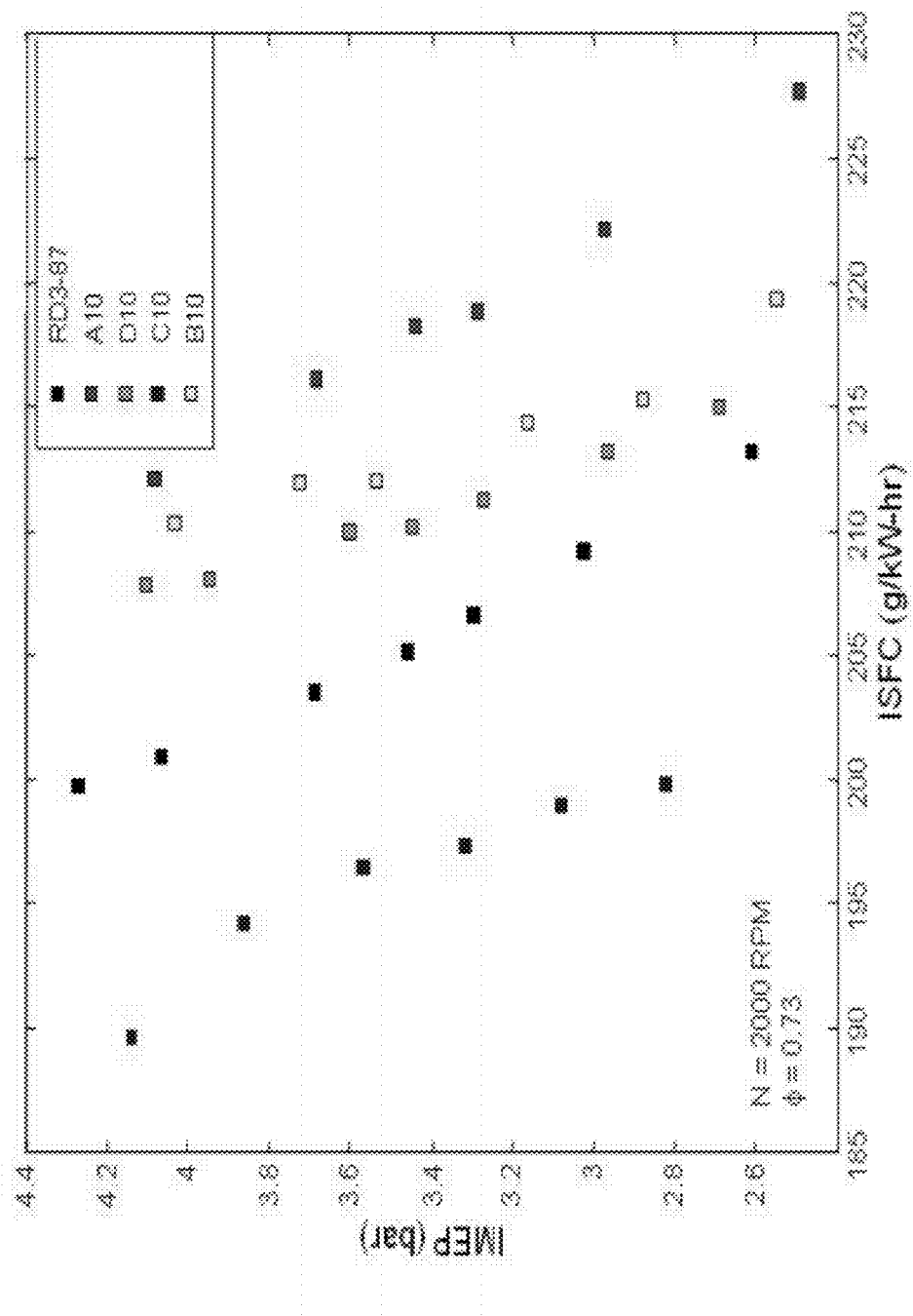

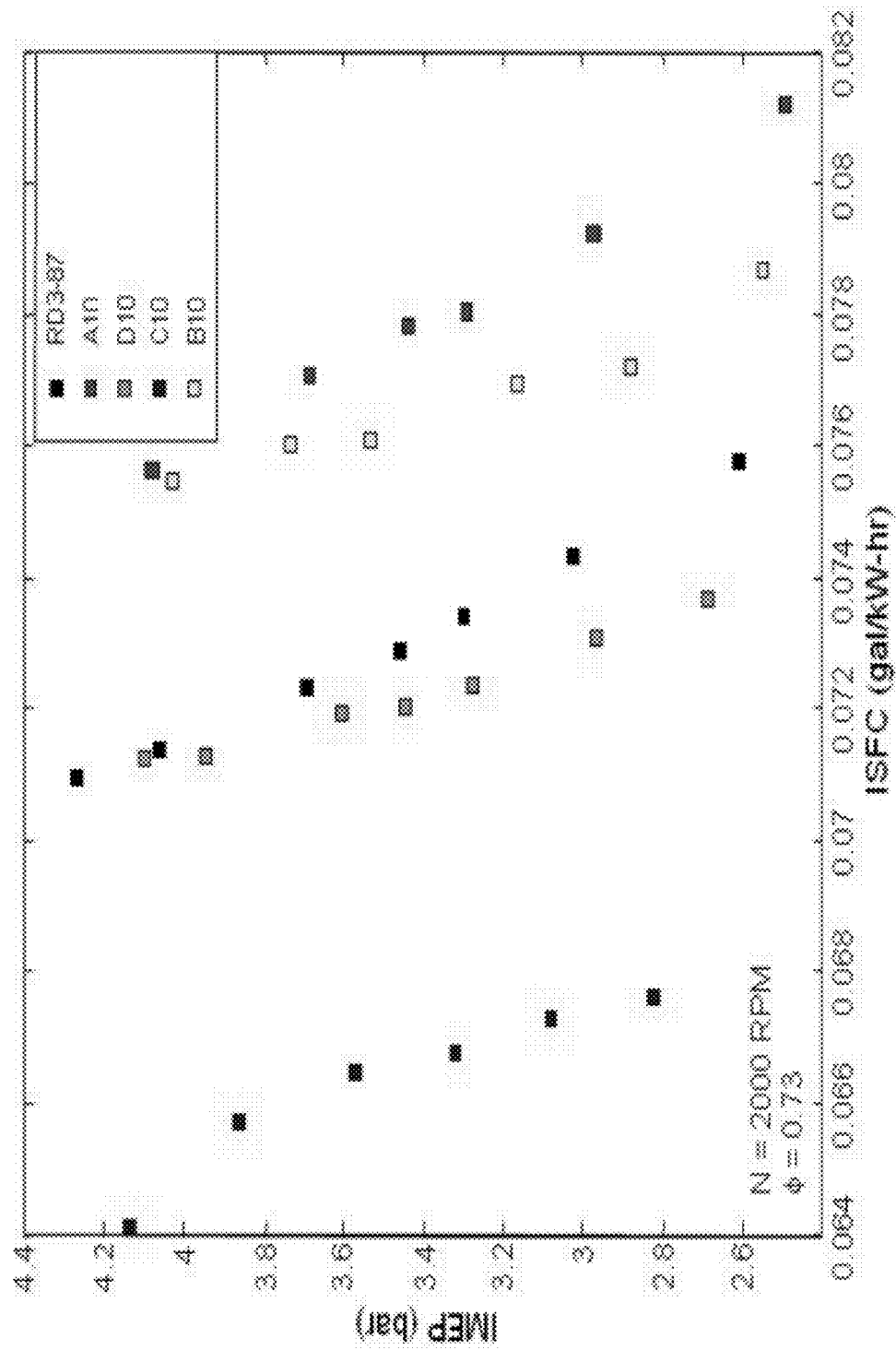

FUEL COMPOSITION

FIELD OF THE INVENTION

The present invention relates to fuel compositions that may be employed in HCCI engines, dual-mode part-time HCCI engines, and spark-assisted HCCI engines.

BACKGROUND OF THE INVENTION

Homogeneous charge compression ignition ("HCCI") is an attractive advanced combustion process that offers potential as a high-efficiency alternative to spark ignition engines. By providing diesel-like efficiencies but with substantially lower $NO_x$ and PM emissions, HCCI also offers a low emissions alternative to diesel engines. Unlike conventional diesel combustion, HCCI does not rely on maintaining a flame front. Rather, combustion occurs as the result of spontaneous auto-ignition at multiple points throughout the volume of charge gas. This unique property of HCCI allows the combustion of very lean mixtures or mixtures that are made very dilute by the addition of combustion-product gases (e.g., by exhaust gas recirculation), resulting in low combustion temperatures that dramatically reduce $NO_x$ emissions. Also, unlike conventional diesel combustion, the charge is sufficiently well-mixed so that PM emissions are very low. Consequently, HCCI provides a low emissions alternative to conventional diesel engines.

Although the use of conventional diesel fuel or gasoline for HCCI would be desirable since these fuels are readily available, achieving acceptable HCCI operating conditions with these fuels can be difficult. With diesel fuel, elevated temperatures are required before significant vaporization occurs making it difficult to form a premixed near-homogeneous charge. Second, diesel fuel has significant cool-combustion chemistry leading to rapid auto-ignition once compression temperatures exceed about 800° K. This can lead to overly advanced combustion phasing and/or require reduced compression ratios that reduce engine efficiency. Conversely, gasoline can require overly high compression ratios or various techniques to provide significant charge heating.

HCCI combustion is generally characterized as a controlled auto-ignition of a homogenous air/fuel mixture that occurs without a flame front. Relatively high compression ratios, along with high charge dilution, un-throttled operation, and very high rates of combustion provide high efficiency. Resulting low burned-gas temperatures minimize the formation of $NO_x$, and elimination of fuel-rich regions prevents the formation of particulate or soot. There are several versions of HCCI each of which has a distinct acronym, for example: HCCI, PCCI, CAI, PPC, MK, UNIBUS, OKP, and the like. Some diesel engine manufactures are starting to use part-time HCCI (in this case, PCCI) in the diesel marketplace. It is expected that part-time HCCI engines will be used in the gasoline passenger car market in the new future.

DESCRIPTION OF THE RELATED ART

Dec et al., U.S. Pat. No. 7,128,046, is directed to a method for slowing the heat-release rate in homogeneous charge compression ignition ("HCCI") engines that allows operation without excessive knock at higher engine loads than are possible with conventional HCCI. This method comprises injecting a fuel charge in a manner that creates a stratified fuel charge in the engine cylinder to provide a range of fuel concentrations in the in-cylinder gases (typically with enough oxygen for complete combustion) using a fuel with two-stage ignition fuel having appropriate cool-flame chemistry so that regions of different fuel concentrations auto ignite sequentially.

SUMMARY OF THE INVENTION

In one embodiment, the present invention is directed to a fuel composition having a boiling range of between 95 to 440 degrees Fahrenheit wherein the fuel composition comprises
(a) a saturates content below 55 vol %;
(b) a RON of from about 88 to about 91;
(c) an olefins content of from about 0 to about 5 vol %;
(d) an aromatics content of from about 32 to about 40 vol %;
(e) an ethanol content of from about 8 to about 16 vol %;
(f) an octane sensitivity of from about 8 to about 11; and
    wherein the fuel composition is used in an HCCI engine.

In one embodiment, the present invention is directed to a method of improving fuel efficiency in an HCCI engine comprises injecting a fuel composition having a boiling range of between 95 to 440 degrees Fahrenheit wherein the fuel composition comprises
(a) a saturates content below 55 vol %;
(b) a RON of from about 88 to about 91;
(c) an olefins content of from about 0 to about 5 vol %;
(d) an aromatics content of from about 32 to about 40 vol %;
(e) an ethanol content of from about 8 to about 16 vol %;
(f) an octane sensitivity of from about 8 to about 11; and
    wherein the fuel composition is used in an HCCI engine.

BRIEF DESCRIPTION OF THE DRAWINGS

FIG. 1 shows acceptable upper and lower limits of operation of an engine with the fuels of the invention and comparative fuels.

FIG. 2 shows gravimetric fuel efficiency of the fuels of the invention and comparative fuels.

FIG. 3 shows volumetric fuel efficiency of the fuels of the invention and comparative fuels.

DETAILED DESCRIPTION OF THE INVENTION

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Definitions

RON—The Research Octane Number is measured in a specially designed single cylinder CFR engine at an engine speed of 600 rpm and a specified intake air temperature that depends on barometric pressure. It reportedly simulates fuel performance under low severity engine operation.

Fuel Composition

One embodiment of the present invention is directed to fuel compositions which, optionally, contain fuel additives and which may be employed in HCCI engines. The fuel composition of the presently claimed invention expands the HCCI operating range and increases the efficiency of HCCI combustion within the HCCI operating range, improving fuel economy and performance of engines using HCCI combustion.

The fuel composition employed in one embodiment of the present invention has a Research Octane Number (RON) of about 88 to about 91. The fuel composition has a saturate content below 55 volumetric percent, preferably a saturate content below 52 volumetric percent; and more preferred, a saturates content below 50 volumetric percent. The fuel composition has an olefins content of about 0 to about 5 volumetric percent, preferably from about 2 to about 5 volumetric percent, and more preferred from about 3 to about 4.5 volumetric percent. The fuel composition has an aromatics content of from about 32 to about 40 volumetric percent, preferably from about 34 to about 40 volumetric percent, and more preferred from about 35 to about 39 volumetric percent. The fuel composition has an ethanol content of from about 8 to about 16 volumetric percent, preferably from about 9 to about 12 and more preferred from about 9 to about 11. The fuel composition has an octane sensitivity of from about 8 to about 11.

Method of Making the Fuel Composition

The fuels employed in the presently claimed invention were taken from a commercial refinery and in some cases n-heptane or ethanol was added. At least two refinery streams were blended to obtain a fuel that has a fuel composition as described hereinabove. Information about typical processes and conditions for making these fuels can be found in "Petroleum Refining" by William Leffler (PennWell Corp, 2000).

Engine Conditions

The fuel of the present invention was employed in a homogenous charge compression ignition (HCCI)—type advanced combustion engine environment. The engine has at least one cylinder. The engine may be operated in full or partial HCCI engine environment. The engine typically has an exhaust recycle valve configuration wherein exhaust gas is re-circulated to the engine. Typically, the exhaust valves open at least twice. During the second or subsequent opening(s), the intake stroke is opened so that hot residual gas is charged back into the cylinder(s) of the engine.

Valve Timings:
Intake Valve Opening/Intake Valve Closing: 346°ATDC/128°BTDC
Exhaust Valve Opening/Exhaust Valve Closing: 130°ATDC/352°BTDC
$2^{nd}$ Exhaust Valve Opening/Exhaust Valve Closing: 326°BTDC/189°BTDC The following examples are presented to illustrate specific embodiments of this invention and are not to be construed in any way as limiting the scope of the invention.

EXAMPLES

Five fuel compositions were injected into a single cylinder 4-stroke gasoline research engine which was operated in full HCCI mode. The fuel compositions were blends of refinery streams. Each fuel was derived by blending the refinery streams to give a desired amount of saturates, aromatics and olefins. Optionally, ethanol was added to the fuel blend; the main properties of the fuels employed in the present invention are listed in Table 1.

Engine Description & Specifications:

The engine had a pent-roof shaped aluminum head with belt-driven double overhead cams with twin intake and exhaust valves.

The engine utilized an exhaust re-breathing valve strategy. Typically, with such a strategy, the exhaust valves open a second time during the intake stroke to re-induct hot residual charge (i.e., injected fuel) back into cylinder.

The engine had the following specifications:
Compression Ratio: 12.5
Bore: 86.0 mm
Stroke: 94.6 mm
Displacement: 0.549 liter
Connecting Rod Length: 152.2 mm
Valve Timings:
Intake Valve Opening/Intake Valve Closing: 346°ATDC/128°BTDC.
Exhaust Valve Opening/Exhaust Valve Closing: 130°ATDC/352°BTDC.
$2^{nd}$ Exhaust Valve Opening/Exhaust Valve Closing: 326°BTDC/189°BTDC.
Fuel Properties:

TABLE 1

Fuels and Their Properties

| FUEL BLEND | RON | Sensitivity | Saturates Vol. % | Aromatics Vol. % | Olefins Vol. % | Ethanol Vol. % | Hydrogen/Carbon Molar Ratio |
|---|---|---|---|---|---|---|---|
| Example 1 | 89.5 | 8.6 | 48.9 | 37.2 | 4.2 | 9.7 | 1.86 |
| Example 2 | 98.1 | 10.8 | 49.8 | 37.5 | 3.5 | 9.7 | 1.87 |
| Comparative Example 1 | 90.5 | 7.9 | 69.6 | 26.1 | 4.4 | 0 | 1.89 |
| Comparative Example 2 | 98.4 | 9.1 | 66.8 | 23.2 | 0.3 | 9.7 | 2.07 |
| Comparative Example 3 | 88.5 | 6.4 | 65.5 | 23.8 | 0.9 | 9.7 | 2.01 |

In one embodiment, the engine is a single cylinder, 4-stroke engine that is operated in full HCCI mode. In one embodiment, a pent-roof shaped aluminum head with belt-driven double overhead cams with twin intake and exhaust valves.

Typically, the engine has a compression ratio of 8 to 20; more preferred 10 to 16; and most preferred 10 to 14.

The fuel of the present invention may be used in an engine that has a varying bore hole size. Typically the bore to stroke ratio of the engine is 0.90:1 to 0.96:1.10.

Typically the displacement of the engine is from about 0.50 L to about 18 L. More preferred, from about 0.8 L to about 6 L.

As described hereinabove, the fuels were prepared by blending gasoline range streams obtained from a refinery in different proportions to obtain the volumetric percent of saturates, aromatics, olefins, and, optionally, ethanol.

Experimental Procedures:

Fuel and air were injected into the combustion chamber of the engine. Since fuels typically have different energy contents, albeit slight, due to different compositions, the same total quantity of energy was injected into the combustion chamber of the engine per cycle for each fuel by adjusting the volume of fuel injected.

The amount of air injected was adjusted to provide an equivalence ratio=0.73=((stoichiometric air/fuel ratio)/(actual air/fuel ratio)).

The intake air temperature was set to enable all fuels to have the same CA50 (engine crank angle position where a cumulative 50% of the fuel has burned) at a reference speed of 2000 rpm.

To establish the acceptable range of operation of each fuel:

The engine speed and load were varied. The load was varied by adjusting the amount of fuel injected into the combustion chamber. Load is reported using the conventional units of Brake Mean Effective Pressure (BMEP).

At each speed, the acceptable low load limit was determined by finding the threshold of where misfire occurred, which is defined as the point where Coefficient of Variance of (Indicated Mean Effective Pressure) IMEP=5%).

At each speed, the acceptable high load limit was determined by the threshold point where the value of the ringing intensity[1] started to exceed a value=5.

[1] Ringing intensity is a term used to confirm the occurrence of knocking in an engine. See O. Seok Kwon and Ock Taeck Lim, "Effect of Boost Pressure on Thermal Stratification in HCCI Engine Using the Multi-Zone Model," Journal of Mechanical Science and Technology, Volume 24, Number 1, 399-406, DOI: 10.1007/s12206-009-1201-y Results FIG. 1 shows the acceptable upper and lower limits of operation for the fuels tested over the speed range of 1200-2400 rpm. As taught in FIG. 1, the wider the operating range, the more effective the fuel. Specifically, with respect to Fuel C the high load of the Brake Effective Mean Pressure is greater than at least about 2.5 bar and the low load of the Brake Effective Mean Pressure is less than at least about 1.75 bar. Fuel C exhibits the widest operating range of the fuels tested.

In addition to having as wide an operating range as possible, an important characteristic is fuel efficiency as measured by Indicated Specific Fuel Consumption, ISFC (see definition below). The lower the ISFC, the more efficient is the fuel. FIGS. 2 & 3 show that both on a gravimetric basis, (grams fuel consumed/kw-hr) and volumetric basis (gallons consumed/kwhr), Fuel C is the most efficient. The volumetric fuel efficiency is the most relevant fuel efficiency parameter for a vehicle driver.

Indicated Specific Fuel Consumption, ISFC=Engine Speed*Fuel Injection Rate/(Indicated Power)
where: Indicated Power=Load*$\pi$*(Bore/2)2*Stroke*Speed

What is claimed is:

1. A fuel composition for an HCCI engine having a boiling range of between 95 to 440 degrees Fahrenheit (35 to 226.7 degree Celsius), wherein the fuel composition comprises:
   (a) a saturates content below 55 vol %;
   (b) a RON of from about 88 to about 98.1;
   (c) an olefins content of from about 0 to about 5 vol %;
   (d) an aromatics content of from 37.2 to about 40 vol %;
   (e) an ethanol content of from about 8 to about 16 vol %; and
   (f) an octane sensitivity of from about 8 to about 11; and
wherein the fuel composition is derived by blending gasoline range streams obtained from a refinery with ethanol, and further wherein the fuel composition is-an HCCI engine fuel composition.

2. The fuel composition of claim 1 wherein the HCCI engine is a part-time HCCI engine that is operated in HCCI mode or in spark ignition mode or in both HCCI mode and spark ignition mode.

3. The fuel composition of claim 1 wherein the saturates content is below 52 vol %.

4. The fuel composition of claim 3 wherein the saturates content is below 50 vol %.

5. The fuel composition of claim 1 wherein the olefins content is from about 2 to about 5 vol %.

6. The fuel composition of claim 5 wherein the olefins content is from about 3 to about 4.5 vol %.

7. The fuel composition of claim 1 wherein the aromatics content is from 37.5 to about 40 vol %.

8. The fuel composition of claim 7 wherein the aromatics content is from 37.2 to 39 vol %.

9. The fuel composition of claim 1 wherein the ethanol content is from about 9 to about 12 vol %.

10. The fuel composition of claim 9 wherein the ethanol content is from about 9 to 11 vol %.

11. A method of improving fuel efficiency in an HCCI engine comprises injecting into the HCCI engine a fuel composition having a boiling range of between 95 to 440 degrees Fahrenheit (35 to 226.7 degree Celsius) which is derived by blending gasoline range streams obtained from a refinery with ethanol, wherein the fuel composition comprises:
   (a) a saturates content below 55 vol %;
   (b) a RON of from about 88 to about 98.1;
   (c) an olefins content of from about 0 to about 5 vol %;
   (d) an aromatics content of from 37.2 to about 40 vol %;
   (e) an ethanol content of from about 8 to about 16 vol %; and
   (f) an octane sensitivity of from about 8 to about 11.

12. The method of claim 11 wherein the HCCI engine is a part-time HCCI engine that is operated in HCCI mode or in spark ignition mode or in both HCCI mode and spark ignition mode.

13. The method of claim 11 wherein a low load Brake Mean Effective Pressure is less than 1.7 bar when the HCCI engine is operated.

14. The method of claim 11 wherein a high load Brake Mean Effective Pressure is greater than 2.5 bar when the HCCI engine is operated.

15. The method of claim 11 wherein a high load Brake Mean Effective Pressure is greater than 2.5 bar and wherein the low load Brake Mean Effective Pressure is less than 1.7 bar when the HCCI engine is operated.

16. The method of claim 11 wherein a volumetric fuel consumption is less than 0.71 gal (2.688 liters)//KW-hr when the HCCI engine is operated.

17. The method of claim 11 wherein a gravimetric fuel consumption is less than 200 g/KW-hr when the HCCI engine is operated.

* * * * *